Figure 1:
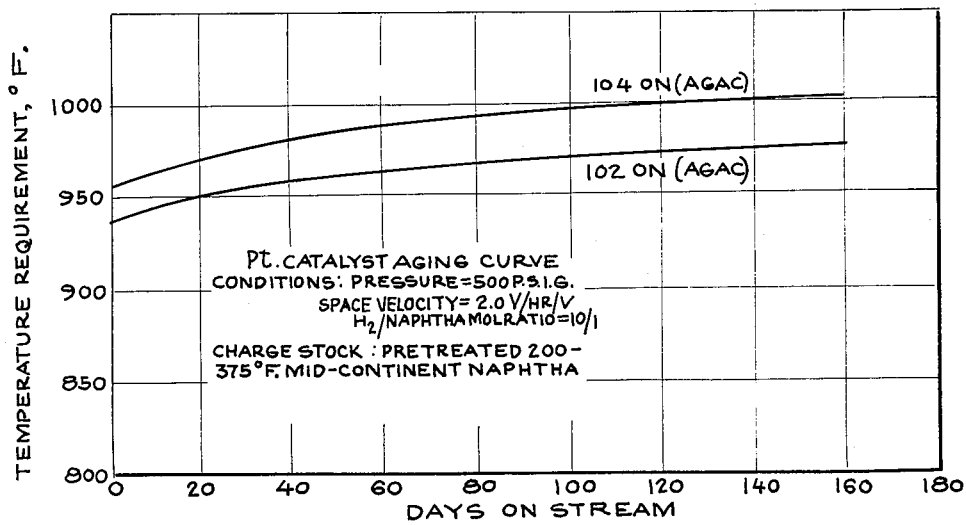

INVENTORS
Philip P. Lifland
BY Anthony E. Potas

AGENT

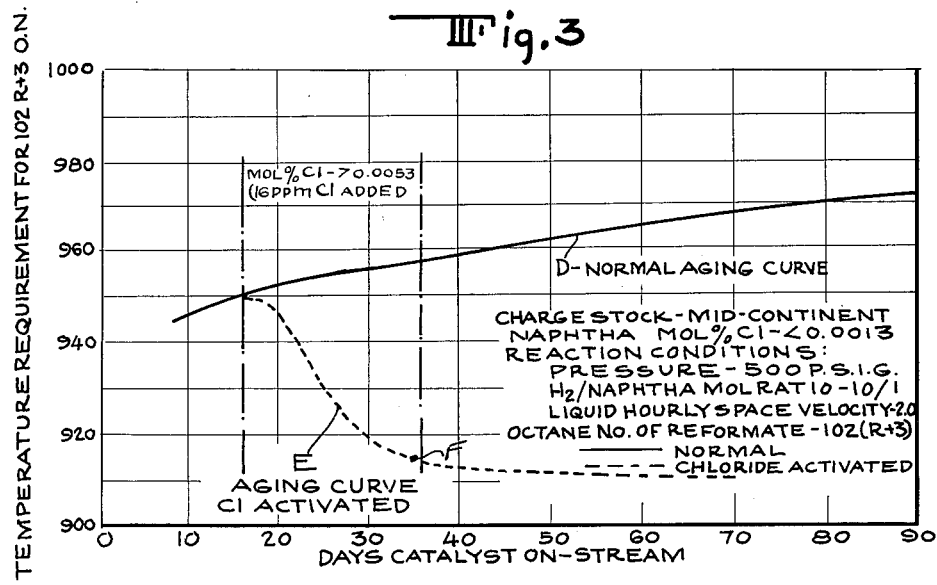
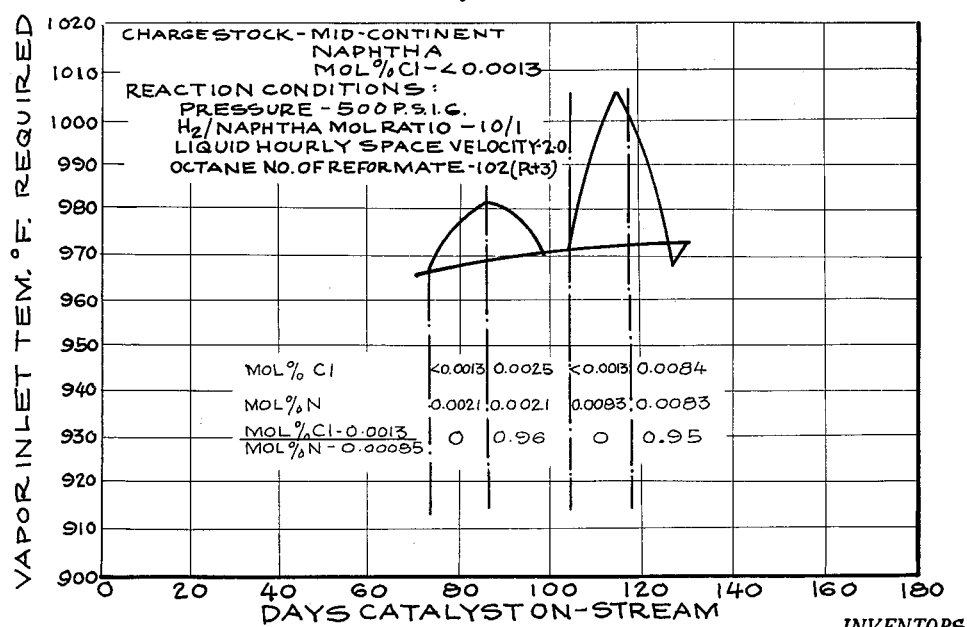

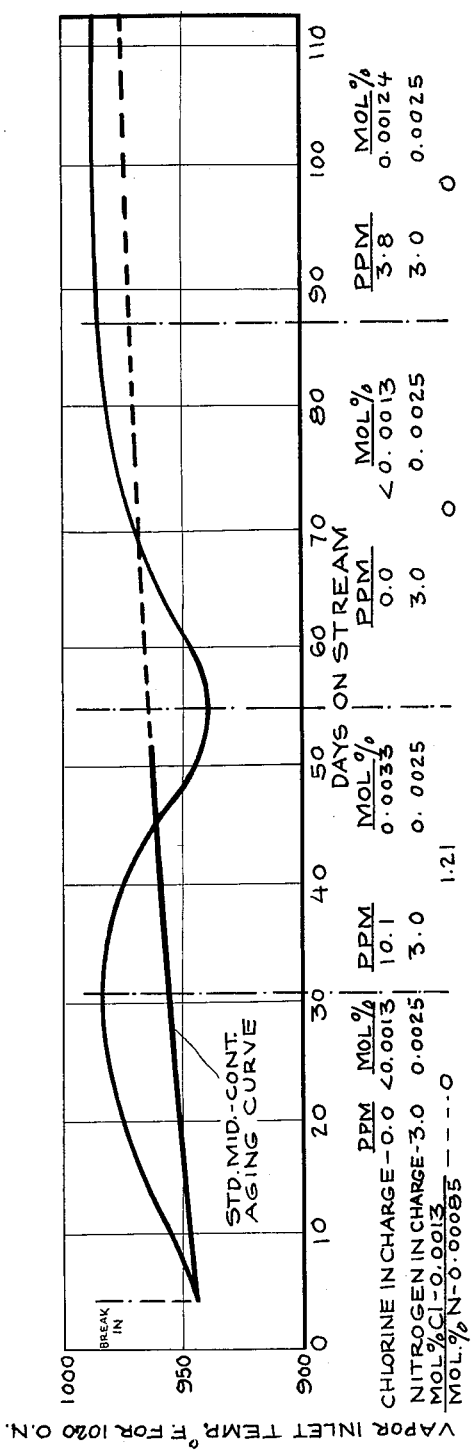

United States Patent Office 2,980,605
Patented Apr. 18, 1961

2,980,605

CORRECTING ACTIVATION OR DEACTIVATION OF PLATINUM-TYPE REFORMING CATALYST

Philip P. Lifland, Woodbury, and Anthony E. Potas, Wenonah, N.J., assignors to Socony Mobil Oil Company, Inc., a corporation of New York Filed Apr. 7, 1959, Ser. No. 804,817

7 Claims. (Cl. 208—138)

The present invention relates to the activation of platinum-group metal reforming catalysts by halogens and the deactivation of platinum-group metal reforming catalysts by nitrogen-containing compounds and, more particularly, to a method of maintaining normal activity and selectivity of a platinum-group metal reforming catalyst when deviation from the normal aging curve for the catalyst is the result of the presence of nitrogen in excess of a tolerable amount or halogen in excess of a tolerable amount.

Generally, the naphtha feed for a reforming unit employing platinum-group-metal reforming catalyst contains about 0.0065 mol percent or 10 p.p.m. of water. In the presence of the aforementioned concentration of water a tolerable concentration or amount of halogen is 0.0013 mol percent or the equivalent of 4 p.p.m. of chlorine. Similarly, the tolerable concentration or amount of nitrogen in the presence of 0.0065 mol percent or 10 p.p.m. of water is 0.00085 mol percent or 1 p.p.m. Accordingly, the numerical values given herein for tolerable concentrations of halogen and nitrogen are those concentrations which in the presence of 0.0065 mol percent or 10 p.p.m. of water do not detectably affect the vapor inlet temperature of the naphtha feed to produce a $C_{5+}$ reformate having substantially constant octane rating. Those skilled in the art will understand that a tolerable concentration or amount of halogen is a concentration or amount insufficient to produce a detectable decrease of the vapor inlet temperature to produce $C_{5+}$ reformate of substantially constant octane rating. Similarly, a tolerable concentration of nitrogen is a concentration insufficient to produce a detectable increase of the vapor inlet temperature to produce $C_{5+}$ reformate of substantially constant octane rating.

It is well-known to those skilled in the art that the reaction temperature for reforming of a specific naphtha feed in a static bed of catalyst to a reformate having a specific octane rating in the absence of nitrogen in excess of about 1 part per million or about 0.00085 mol percent, in the absence of halogen in excess of the equivalent of about 4 parts per million of chlorine or about 0.0013 mol percent must be raised periodically while the catalyst is on-stream. That is to say, the activity of the catalyst decreases or the catalyst ages. When charging the same feed and producing a reformate of substantially constant octane rating in the absence of inhibitors such as nitrogen and in the absence of promoters such as halogens the rate of loss in activity or the aging rate can be readily represented by an aging curve which represents graphically the relation between the vapor inlet temperature requirement and the days on-stream for the reforming of a specific charge stock to produce a reformate having a substantially constant octane rating.

The standard aging curves are presented in Figure 1 for a particle-form platinum-group metal reforming catalyst employed in a static bed to reform a Mid-Continent naphtha containing not more than 1 p.p.m. of nitrogen and having a boiling range of 200° to 375° F. to reformates having octane numbers of 102 O.N. (Research + 3 cc. TEL) and 104 O.N. (Research + 3 cc. TEL). It will be observed that these curves are smooth curves having no exotic hills or valleys. The operation of a reforming unit can be controlled by comparison of the vapor inlet temperature for the days on-stream with the corresponding value on the curve. Any marked deviation from the aging curve is an indication of the presence of an inhibitor such as nitrogen in excess of the tolerable limit when the vapor inlet temperature for the days on-stream is markedly above the standard aging curve or of a promoter such as halogen in excess of the tolerable limit when the vapor inlet temperature for the days on-stream is markedly below the standard aging curve.

Figure 2:
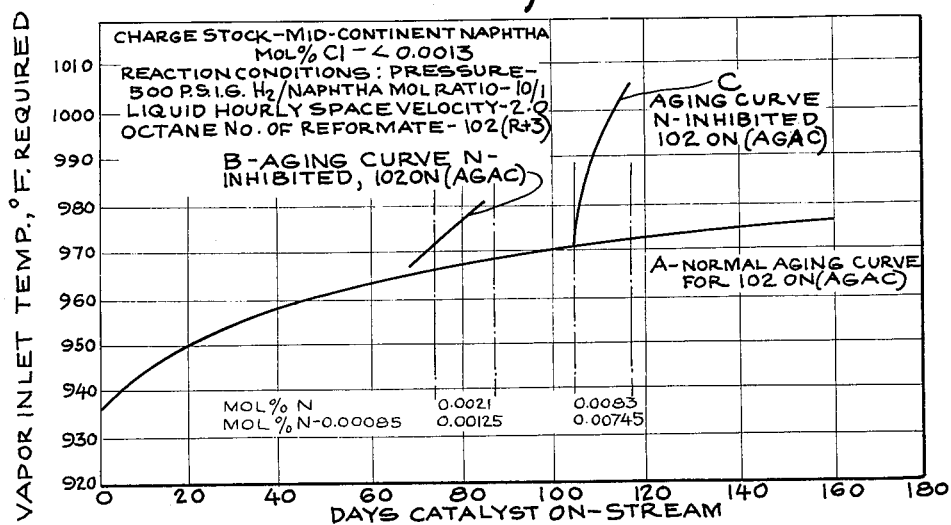

Reference to Figure 2 will provide a graphic illustration of the effect of an inhibitor such as nitrogen on the aging curve for a platinum-group metal reforming catalyst employed as a static bed in the reforming of a Mid-Continent naphtha containing less than 0.0013 mol percent chlorine and not more than 1 p.p.m. of nitrogen when the nitrogen content is increased as indicated. The curve A is the normal aging curve for the catalyst employed when producing a reformate having an octane rating of 102 (Research + 3 cc. TEL) from this Mid-Continent naphtha. It will be noted that a chlorine concentration of 0.0013 mol percent or less has no detectable effect upon the activity of this catalyst.

After the catalyst had been on-stream for 70 days a nitrogen compound, pyridine, was added to the feed in amount to produce a feed having a nitrogen concentration of 0.0021 mol percent. Since a nitrogen concentration of 0.00085 has no detectable inhibiting effect upon the aging of this platinum-group metal catalyst, curve B clearly establishes that nitrogen in a concentration of 0.00125 mol percent in excess of the maximum tolerable concentration of nitrogen has a very strong inhibiting effect upon the catalyst activity. In 15 days the temperature requirement has increased 12° F. or 110 percent of the increased temperature requirement in the absence of an inhibiting concentration of nitrogen for 90 days.

After 17 days on-stream with a naphtha feed containing 0.0021 mol percent nitrogen as pyridine, the feed stock was changed to one containing not more than 1 p.p.m. of nitrogen and the activity of the catalyst returned to normal. For 17 days (from the 87th day to the 104th day) the deactivation of the catalyst in the absence of inhibiting concentrations of nitrogen proceeded at a rate in accordance with the normal aging curve A.

After 104 days on-stream pyridine was added to the naphtha charge to produce a charge stock containing 0.0083 mol percent of nitrogen or 0.00745 mol percent nitrogen in excess of the tolerated concentration. It will be observed that the temperature requirement was increased 34° F. in 13 days when a naphtha feed containing 0.00745 mol percent nitrogen in excess of the tolerated nitrogen content was reformed. This represents a temperature requirement increase 567 percent of that required under normal aging conditions in 56 days.

Chlorine, on the other hand, activates or promotes the catalyst so that a markedly lower vapor inlet temperature is required in order to produce a reformate of substantially the same octane rating. This is clearly illustrated by curve E in Figure 3. Cursory examination of the curve E would lead one to consider such activation and its concomitant lowered temperature requirement advantageous. However, in the presence of chlorine or other halogen in excess of 0.0013 mol percent on the charge stock the selectivity of the catalyst is reduced and an intolerable amount of hydrocracking takes place as is evident from the composition of two reformates each having an octane rating of 102 (R+3 cc.) one produced when the chlorine content was tolerable and the other produced when the charge stock contained 0.0054 mol percent chlorine, i.e., 0.0041 mol percent chlorine in excess of the tolerable maximum.

Charge stock:
  Mid-Continent straight run naphtha, boiling range 200° F. to 380° F.
Catalyst:
  0.6 weight percent platinum
  0.6 weight percent chlorine on alumina support

| | | |
|---|---|---|
| Chlorine concentration, mol percent | 0.0013 | 0.0054 |
| Vapor inlet temperature, ° F | 950 | 915 |
| $C_{5+}$ Reformate: | | |
| Octane Number (R+3 cc.) | 102.2 | 101.9 |
| Yield, vol. percent of charge | 77.3 | 75.2 |

In other words, even although the reaction temperature was lower the yield of $C_{5+}$ reformate was about 2 percent less.

We have now discovered that the deleterious effects of nitrogen inhibition of catalyst activity and chlorine activation of catalyst activity can be overcome by neutralizing the effect of either one by the addition of the other to the reactor contents. However, it is to be noted that the addition of either one in atomic equivalent amount does not produce the desired neutralizing effect. That is to say, concentrations of nitrogen up to about 0.00085 mol percent in the charge stock have no detectable effect upon the activity of the catalyst as measured by an increase in the required vapor inlet temperature to produce a $C_{5+}$ reformate of substantially constant octane rating. Similarly, a concentration of chlorine up to about 0.0013 mol percent has no detectable effect upon the required vapor inlet temperature to produce a $C_{5+}$ reformate of substantially constant octane rating. Therefore, in determining the concentration of neutralizing material to be admixed with the naptha feed the tolerable concentration of halogen and the tolerable concentration of nitrogen are ignored. That is to say, the chlorine to nitrogen ratio in the naphtha feed must be one ±20 percent as indicated by the following equation where A is mol percent halogen in the naphtha feed and B is mol percent nitrogen in the naphtha feed, C is the tolerable concentration of halogen as mol percent and D is the tolerable concentration of nitrogen as mol percent. Thus $$\frac{A-C}{B-D}=1\pm0.2$$

where $A-C-B+D\leqslant C$ and $B-D-A+C\leqslant D$, and for the specific illustration of chlorine in the presence of 0.0065 mol percent or 10 p.p.m. of water the first expression becomes $$\frac{A-0.0013 \text{ mol percent}}{B-0.00085 \text{ mol percent}}=1\pm0.2$$

The foregoing is illustrated by the curves of Figures 4 and 5. Thus, in Figure 4 when $$\frac{A-0.0013 \text{ mol percent}}{B-0.00085 \text{ mol percent}}=0$$

the temperature required to produce a $C_{5+}$ reformate having an octane rating of 102 (R+3) increased until enough halogen was added to the naphtha feed to provide a relationship expressed by the equation $$\frac{A-0.0013 \text{ mol percent}}{B-0.00085 \text{ mol percent}}=0.96 \text{ or } 0.95$$

The curves of Figure 5 graphically show the effect when the N/hal ratio is not 1±0.2. Accordingly, designating the value of $$\frac{A-0.0013 \text{ mol percent}}{B-0.00085 \text{ mol percent}}$$

as K where A=mol percent of halogen and B=mol percent of nitrogen, the reaction temperatures required to produce a $C_{5+}$ reformate having an octane rating of 102 (R+3) from Mid-Continent naphtha when K has various values are tabulated hereinafter.

| K | Days Catalyst on-Stream | Reaction Temperature for 102 O.N. (R+3), ° F. |
|---|---|---|
| (1) | 10 | 949 |
| 0 | 30 | 987 |
| (1) | 45 | 960 |
| 1.21 | 55 | 940 |
| (1) | 65 | 966 |
| 0 | 90 | 985 |

[1] Absence of halogen in excess of 0.0013 mol percent and absence of nitrogen in excess of 0.00085 mol percent.

Thus, it has been demonstrated that halogen in excess of 0.0013 mol percent can be neutralized by nitrogen, and that nitrogen in excess of 0.00085 can be neutralized with halogen. However, to maintain the activity and selectivity of the catalyst substantially constant to produce a $C_{5+}$ reformate of substantially constant octane rating and to maintain a reaction temperature substantially that of the standard aging curve for the required octane rating and the number of days the catalyst has been onstream the ratio of halogen to nitrogen is critical and cannot be greater than 1±0.2 for the ratio $$\frac{A-C}{B-D}=K=1\pm0.2$$

where A=concentration of halogen in mol percent and B=concentration of nitrogen in mol percent, and $A-C-B+D\leqslant C$ and $B-D-A+C\leqslant D$.

It has now been found that, although halogen activation can be compensated by a decrease in the vapor temperature at the inlet to the reactor with a concomitant yield loss and nitrogen deactivation can be compensated under special conditions by increasing the vapor temperature at the inlet of the reactor, these effects can be overcome by careful and critical addition of the compensating component of the nitrogen-halogen pair. That is to say, when the feed to a reforming unit employing one or more reactors contains halogen in concentration sufficient to detrimentally activate or promote the reforming capabilities of a platinum-group metal reforming catalyst, i.e., in excess of the tolerable concentration, the normal capabilities of the catalyst can be restored by introducing into the reaction system an amount of nitrogen atomically equal to the aforesaid excess. On the other hand, when the feed to a reforming unit employing a platinum-group metal reforming catalyst contains nitrogen in an amount sufficient to reduce the normal capabilities of the catalyst, i.e., in excess of the tolerable concentration, the normal activity of the catalyst can be restored by introducing into the reaction system, preferably in the feed, an amount of halogen atomically equal to the aforesaid excess.

In industrial operations the presence of halogen in the feed in excess of the tolerable concentration is first detected by the need to reduce the vapor inlet temperature, i.e., the temperature of the vapors at the inlet of the reactor or reactors, to a temperature below the temperature on the normal aging curve for the catalyst to produce a reformate having the required octane. Thus, when reforming unpoisoned naphtha containing not more than 0.0013 mol percent, i.e., 4 parts per million (p.p.m.) by weight of chlorine and not more than 1 p.p.m. of nitrogen (by weight) over a platinum-group metal reforming catalyst in the presence of hydrogen to produce a reformate having a substantially constant octane rating, the temperature of the vapors at the inlet of the reactors, i.e., the vapor inlet temperature, must be raised as the catalyst ages. When the vapor inlet temperature is plotted against the days on-stream a normal aging curve for platinum-group metal catalyst is obtained. Such normal catalyst aging curves are presented in Figure 1.

When the same naphtha is poisoned with halogen in excess of 0.0013 mol percent the vapor inlet temperature to produce a reformate having the same octane rating is lower than that of the normal aging curve as, for example, the temperature designated "F" in Figures 3, and the yield of $C_{5+}$ reformate is reduced 3 percent. In accordance with the present invention the poisoned naphtha is reformed in contact with the platinum-group metal reforming catalyst in the presence of hydrogen and an amount of nitrogen atomically equivalent to the halogen content of the poisoned naphtha ±20 percent as described hereinbefore or in other words as stated hereinbefore $K=1\pm0.2$.

Similarly, nitrogen in excess of 1 p.p.m. (0.00085 mol percent) makes it necessary to raise the vapor inlet temperature above that of the normal catalyst aging curve. This is corrected by admixing halogen in amount equal to the atomic equivalent of the nitrogen in excess of 1 p.p.m. or 0.00085 mol percent so that the vapor inlet temperature is brought substantially on the normal catalyst aging curve.

Thus, it is manifest that the present invention provides for reforming a naphtha poisoned by halogen or nitrogen by admixing with the poisoned naphtha a critical amount of the other poison which is sufficiently to bring the vapor onlet temperature back substantially to the normal catalyst aging curve.

When a straight run naphtha or fraction thereof containing halogen is to be reformed in the presence of a mixture of hydrocarbons containing nitrogen in excess of 1 p.p.m., the halogen of the straight run naphtha can be readily neutralized by hydrodenitrogenizing the mixture of hydrocarbons containing nitrogen in excess of 1 p.p.m. only to that extent necessary to have in the mixture of hydrocarbons a compensating concentration of nitrogen. Thus, when a thermal naphtha containing 80 p.p.m., i.e., 0.064 mol percent of nitrogen is to be reformed and a straight run naphtha containing less than 1 p.p.m. nitrogen, 0.0074 mol percent of halogen as of chlorine is likewise to be reformed, the thermal naphtha is contacted in a pretreater in the presence of hydrogen with a hydrogenating catalyst having hydrodenitrogenizing capabilities to produce a pretreater effluent the $C_{5+}$ and heavier hydrocarbons of which contain 0.0057 to 0.0077 mol percent of nitrogen. The $C_{5+}$ hydrocarbons of the pretreater effluent are then mixed with the straight run naphtha to provide a blend containing 0.0037 mol percent chlorine, 0.00285 to not more than 0.00385 mol percent nitrogen. The blend is then reformed over a platinum-type catalyst to the required octane rating for the $C_{5+}$ reformate at normal vapor inlet temperatures.

Illustrative of the foregoing is the following example:

Feed: Thermal naphtha—
   B. R. _____ 180° F. to 380° F.
   Nitrogen _____ 80 p.p.m.
Catalyst:
   3.3 wt. percent cobalt oxide
   16.1 wt. percent molybdenum oxide on alumina
Reaction temperature _____ 690° F.
Reaction pressure _____ 465 p.s.i.g.
Space velocity, v./hr./v. _____ 5.
Hydrogen/bbl. s.c.f. _____ 500.
Pretreater effluent _____ $C_5$ and heavier hydrocarbons.
Nitrogen, mol percent _____ 0.0068.
Straight run naphtha:
   B. R. _____ 180° F. to 380° F.
   Nitrogen _____ <1 p.p.m.
   Chlorine _____ 0.0074 mol percent.

Blend:
   Pretreater effluent $C_5$ and heavier hydrocarbons ____ 50 percent.
   Straight run naphtha _____ 50 percent.
   Nitrogen, mol percent _____ 0.00335.
   Chlorine, mol percent _____ 0.0037.
Reforming conditions to make 102 O.N. (R+3 cc. TEL):
   Reaction temperature _____ 952° F.
   Reaction pressure, p.s.i.g. _____ 500.
   Space velocity, v./hr./v. _____ 2.
   $H_2$/naphtha mol ratio _____ 10.

The data presented in Table II summarize the effect of halogen upon the vapor inlet temperature and yield and the effect of neutralizing the halogen upon the vapor inlet temperature and yield as compared with the same values for a naphtha containing no halogen in excess of 0.0013 mol percent and nitrogen not in excess of 1 p.p.m.

*Table II*
[Catalyst: 0.6 wgt. percent platinum on alumina]

| Case | I | II | III | IV |
|---|---|---|---|---|
| Halogen, mol percent | <0.0013 | <0.0013 | 0.0054 | 0.0025 |
| Nitrogen, mol percent | <0.00085 | 0.0021 | <0.00085 | 0.0021 |
| "K" | (1) | 0 | ∞ | 0.95 |
| Reaction Pressure, p.s.i.g. | 500 | 500 | 500 | 500 |
| $H_2$/naphtha, mol ratio | 10 | 10 | 10 | 10 |
| O.N. $C_{5+}$ reformate (Research + 3 cc. TEL) | 102.0 | 101.8 | 101.9 | 101.9 |
| Vapor Inlet Temperature | 965 | 981 | 915 | 970 |
| Yield, vol. percent of Charge | 80.0 | 79.9 | 75.2 | 79.6 |

¹ Absence of halogen in excess of 0.0013 mol percent and absence of nitrogen in excess of 0.00085 mol percent.

It will be observed that the feed in Case I contained tolerable amounts, i.e., less than 0.0013 mol percent halogen and less than 0.00085 mol percent, i.e., less than 1 p.p.m., of nitrogen. It will be observed that in Case II the concentration of nitrogen was sufficient to require a sixteen degrees increase in the vapor inlet temperature to produce the required octane rating. It is manifest that in Case III sufficient chlorine was present to require a decrease of fifty degrees in the vapor inlet temperature. However, in case IV, where the feed contained neutralizing amounts of nitrogen and halogen, the vapor inlet temperature is substantially the same as in Case I and the yield of $C_{5+}$ reformate is substantially the same.

Accordingly, the present invention provides a method of reforming a mixture of hydrocarbons boiling in the gasoline range and containing more than a tolerable concentration of nitrogen, or more than a tolerable concentration of halogen in the presence of hydrogen and in contact with platinum-group metal reforming catalyst under reforming conditions substantially the same as required to produce a reformate having a required octane rating from a mixture of hydrocarbons boiling in the gasoline boiling range and containing not more than the tolerable concentration of nitrogen or not more than the tolerable concentration of halogen which comprises reforming a poisoned charge mixture of hydrocarbons containing one poison selected from the group consisting of more than the tolerable concentration of a halogen and more than the tolerable concentration of nitrogen at substantially the same reforming conditions required to produce a $C_{5+}$ reformate having the required octane rating from an unpoisoned naphtha, i.e., containing not more than a tolerable concentration of halogen or not more than a tolerable concentration of nitrogen and containing substantially the same concentrations of naphthenes and paraffins and adding to the aforesaid poisoned charge mixture an amount of the platinum-group metal reforming-catalyst-poison not present in the aforesaid charge mixture of hydrocarbons boiling in the gasoline boiling range in an amount not differing from the atomic equivalent by more than 20 percent thereof of the platinum-group metal reforming-catalyst-poison present in the aforesaid charge mixture of hydrocarbons boiling in the gasoline boiling range. In other words, the present invention provides for reforming a poisoned naphtha containing in excess of the tolerable concentration of halogen under standard reforming conditions for reforming a naphtha containing not more than the tolerable concentration of halogen to produce a reformate having a required octane rating (Research+3 cc. TEL) wherein a nitrogen-containing material forming ammonia in the presence of hydrogen and a platinum-group metal reforming catalyst is present in the naphtha feed to the reforming reaction zone in an amount equal to, but not more than 1.2 times, nor less than 0.8 times, the atomic equivalent of the halogen in excess of the tolerable concentration present in the aforesaid poisoned charge mixture and to provide a charge mixture the hydrocarbons of which boiling in the gasoline range, i.e., the gasoline hydrocarbons, contain an amount of nitrogen equal to the atomic equivalent of halogen but not in excess of the aforesaid atomic equivalent by more than 1 p.p.m., i.e., not in excess of 0.00085 mol percent nitrogen. The present invention also provides for reforming a poisoned charge mixture of hydrocarbons boiling in the gasoline range and containing in excess of the tolerable concentration of nitrogen under reforming conditions substantially the same as the reforming conditions required to produce a $C_{5+}$ reformate having the required octane rating (Research+3 cc. TEL) from an unpoisoned naphtha containing substantially the same concentrations of naphthenes and paraffins but not containing a platinum-group reforming catalyst poison selected from the group consisting of not more than the tolerable concentration of halogen and not more than the tolerable concentration of nitrogen wherein a halogen-containing material capable of forming hydrogen halide in the presence of hydrogen and platinum-group metal catalyst is present in the naphtha feed to the reforming reaction zone in an amount equal to the atomic equivalent of the nitrogen present in the aforesaid poisoned charge, any amount of halogen in excess of the aforesaid atomic equivalent being not more than 0.0013 mol percent, and to provide a charge mixture the gasoline hydrocarbons of which contain an amount of halogen in excess of the atomic equivalent of nitrogen not in excess of 0.0013 mol percent.

We claim:

1. In the reforming of a poisoned naphtha containing a not more than about 0.0065 mol percent of water and platinum-group metal-reforming-catalyst-poison selected from the group consisting of halogen in excess of a tolerable concentration of 0.0013 mol percent and nitrogen in excess of a tolerable concentration of 0.00085 mol percent wherein said poisoned naphtha is reformed in contact with a platinum-group metal catalyst in the presence of hydrogen at a vapor inlet temperature below that of the temperature of the normal catalyst aging curve when the poisoned naphtha contains said excess halogen and at a vapor inlet temperature above that of the normal catalyst aging curve when the poisoned naphtha contains said excess nitrogen to produce a reformate having the required octane rating (Research+3 cc. TEL), the improvement which comprises reforming said poisoned naphtha in the presence of an added amount of catalyst poison selected from the aforesaid group consisting of nitrogen and halogen not present in said poisoned naphtha equal to the atomic equivalent of the excess of the aforesaid catalyst poison selected from the aforesaid group consisting of nitrogen and halogen present in said naphtha, the excess of added catalyst poison selected from the aforesaid group consisting of nitrogen and halogen not exceeding the tolerable concentration of said added catalyst poison.

2. In the reforming of a poisoned naphtha containing not more than about 0.0065 mol percent of water and in excess of a tolerable concentration of 0.00085 mol percent nitrogen wherein said poisoned naphtha is reformed in the presence of hydrogen in contact with platinum-group metal reforming catalyst at a vapor inlet temperature higher than that of the normal catalyst aging curve to produce a reformate having the required octane rating, the improvement of which comprises reforming said poisoned naphtha in the presence of an amount of added halogen which is the atomic equivalent of the amount of nitrogen in excess of said tolerable concentration of 0.00085 mol percent but not in an amount sufficient to lower the vapor inlet temperature substantially below that of the normal catalyst aging curve.

3. A method of reforming a poisoned first naphtha containing in excess of a tolerable concentration of 0.0013 mol percent of halogen which comprises hydrodenitrogenizing a second naphtha to provide a partially denitrogenized second naphtha containing an amount of nitrogen equal to the atomic equivalent of the halogen content of a first naphtha but not in excess of a tolerable concentration of 0.00085 mol percent of nitrogen in a blend of the aforesaid first and said partially denitrogenized second naphtha, mixing said partially denitrogenized naphtha with said first naphtha to provide a naphtha blend containing not more than about 0.0065 mol percent of water and not more than a tolerable concentration of 0.00085 mol percent of nitrogen in excess of the atomic equivalent of the halogen in said blend and reforming said blend in contact with platinum-group metal reforming catalyst in the presence of hydrogen at a vapor inlet temperature substantially the same as that of the normal catalyst aging curve for the required octane.

4. A method of reforming a posioned naphtha containing water and in excess of 0.0013 mol percent halogen which comprises mixing a first naphtha containing water and in excess of 0.0013 mol percent halogen with a second naphtha containing water and nitrogen to provide a naphtha blend containing 10 p.p.m. of water, an amount of nitrogen equal to and not more than 1 p.p.m. in excess of the atomic equivalent of said halogen and reforming said naphtha blend in contact with platinum-group metal reforming catalyst in the presence of hydrogen at a vapor inlet temperature substantially that of a normal platinum-group metal catalyst aging curve to produce a reformate having the required octane rating.

5. A method of reforming a poisoned naphtha containing in excess of 1 p.p.m. of nitrogen which comprises mixing a first naphtha containing nitrogen in excess of 1 p.p.m. with a second naphtha containing in excess of 0.0013 mol percent halogen to provide a naphtha blend containing an amount of halogen equal to and not more than 0.0013 mol percent halogen in excess of the atomic equivalent of said nitrogen, regulating the amount of water present in said blend to 10 p.p.m., and reforming said naphtha blend in contact with platinum-group metal reforming catalyst in the presence of hydrogen at a vapor inlet temperature substantially that of a normal platinum-group metal catalyst aging curve to produce a reformate having the required octane rating.

6. A method of reforming poisoned naphtha which comprises blending at least two naphthas to provide a naphtha blend containing not more than about 0.0065 mole percent of water and halogen and nitrogen in substantially equivalent atomic amounts and not more than the tolerable concentration of 0.00085 mol percent of nitrogen in excess of the atomic equivalent of said halogen and halogen in amount not more than a tolerable concentration of 0.0013 mol percent in excess of the atomic equivalent of said nitrogen and reforming said blend in contact with platinum-group metal catalyst in the presence of hydrogen at a vapor inlet temperature substantially the same as that of a normal aging curve for platinum-type reforming catalyst to produce reformate having the required octane rating.

7. In the reforming of a poisoned naphtha containing not more than about 0.0065 mol percent of water in the presence of an excess of a tolerable concentration of 0.0013 mol percent based upon the naphtha charged of halogen wherein said naphtha is reformed in the presence of hydrogen in contact with platinum-type reforming catalyst at a vapor inlet temperature lower than that of the normal catalyst aging curve to produce a reformate having the required octane rating, the improvement which comprises reforming said naphtha in the presence of an amount of added nitrogen-containing material forming ammonia in the presence of the aforesaid platinum-type reforming catalyst and hydrogen, said amount of the aforesaid added nitrogen-contianing material being equal to, but not more than 1.2 times nor less than 0.8 times, the atomic equivalent of halogen in excess of the aforesaid tolerable concentration and at a vapor inlet temperature substantially that of the normal catalyst aging curve.

References Cited in the file of this patent

UNITED STATES PATENTS

| | | |
|---|---|---|
| 2,642,384 | Cox | June 16, 1953 |
| 2,643,214 | Hartwig | June 23, 1953 |
| 2,849,377 | Ogburn et al. | Aug. 26, 1958 |